(12) United States Patent
Matsumoto et al.

(10) Patent No.: US 9,211,826 B2
(45) Date of Patent: Dec. 15, 2015

(54) FRAME STRUCTURE FOR SEAT BACK

(71) Applicant: Toray Industries, Inc., Tokyo (JP)

(72) Inventors: Satoshi Matsumoto, Nagoya (JP); Yoshito Kuroda, Nagoya (JP); Koji Yamaguchi, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/361,033

(22) PCT Filed: Dec. 13, 2012

(86) PCT No.: PCT/JP2012/082290
§ 371 (c)(1),
(2) Date: May 28, 2014

(87) PCT Pub. No.: WO2013/094501
PCT Pub. Date: Jun. 27, 2013

(65) Prior Publication Data
US 2014/0327290 A1 Nov. 6, 2014

(30) Foreign Application Priority Data
Dec. 22, 2011 (JP) .................. 2011-281087

(51) Int. Cl.
B60N 2/68 (2006.01)
B60R 22/34 (2006.01)
B60R 22/26 (2006.01)

(52) U.S. Cl.
CPC ............... B60N 2/688 (2013.01); B60R 22/26 (2013.01); B60R 22/34 (2013.01); B60R 2022/3402 (2013.01)

(58) Field of Classification Search
CPC ........ B60N 2/688; B60R 22/34; B60R 22/26; B60R 2022/3402
See application file for complete search history.

(56) References Cited

U.S. PATENT DOCUMENTS

| 5,318,341 | A | * | 6/1994 | Griswold et al. ........ 297/362.11 |
| 5,362,132 | A | * | 11/1994 | Griswold et al. ............. 297/483 |
| 5,501,509 | A | * | 3/1996 | Urrutia .................... 297/452.18 |
| 5,752,845 | A | * | 5/1998 | Fu ................................ 439/247 |
| 5,782,537 | A | * | 7/1998 | Leistra et al. ................. 297/473 |
| 5,833,317 | A | * | 11/1998 | Massara et al. ............... 297/374 |

(Continued)

FOREIGN PATENT DOCUMENTS

| DE | 4213917 A1 | * 11/1992 | ............ B60N 2/688 |
| DE | 4208150 A1 | * 9/1993 | |
| EP | 2 491 820 | 8/2012 | |
| JP | 03-125449 U | * 12/1991 | |
| JP | 05-168544 | 7/1993 | |
| JP | 09-136610 | 5/1997 | |
| JP | 10-129416 | 5/1998 | |
| JP | 2000-006696 | 1/2000 | |
| JP | 2005-000194 | 1/2005 | |
| JP | 2006-081676 | 3/2006 | |
| JP | 2011-178300 | 9/2011 | |
| WO | 2011/049071 | 4/2011 | |

OTHER PUBLICATIONS

Supplementary European Search Report and Written Opinion for corresponding Application No. 12859932.1 mailed on or about May 6, 2015 (7 pages).*

Primary Examiner — Rodney Mintz
(74) Attorney, Agent, or Firm — DLA Piper LLP (US)

(57) ABSTRACT

A frame structure for a seat back to be provided in the seat back having a seatbelt retractor and a seatbelt guide at a frame top, wherein the frame structure includes an oblique frame and a vertical frame, the oblique frame obliquely extending upward to a seatbelt guide installation section from a first support point located at an end side of a lower part of the seat back in a seat width direction, the vertical frame extending upward from a second support point located at another end side of the lower part of the seat back in the seat width direction and connecting to the oblique frame at a top.

12 Claims, 3 Drawing Sheets

(56) References Cited

U.S. PATENT DOCUMENTS

| | | | |
|---|---|---|---|
| 5,882,075 A * | 3/1999 | Partington et al. | 297/344.13 |
| 5,984,419 A * | 11/1999 | Partington et al. | 297/473 |
| 5,988,748 A * | 11/1999 | Morrison et al. | 297/328 |
| 6,010,195 A * | 1/2000 | Masters et al. | 297/452.55 |
| 6,027,171 A * | 2/2000 | Partington et al. | 297/452.18 |
| 6,199,252 B1 * | 3/2001 | Masters et al. | 29/91.1 |
| 2012/0267936 A1 * | 10/2012 | Nakagaki et al. | 297/452.18 |
| 2014/0300165 A1 * | 10/2014 | Matsumoto et al. | 297/354.1 |

\* cited by examiner

FRAME STRUCTURE FOR SEAT BACK

TECHNICAL FIELD

This disclosure relates to a frame structure for vehicle seat backs and specifically relates to a frame structure for seat backs, which has a high stiffness against the forward load applied to the seat and which is capable of achieving a lightweight structure.

BACKGROUND

A cushion of vehicle seat backs usually incorporates a frame structure for seat backs to provide the seat backs with sufficient strength and stiffness. There have been various measures to improve the seat backs in strength and stiffness.

JP 2006-81676-A discloses a frame structure improved in strength and stiffness by combining first and second metal frames with a hollow planar resin frame integrated with reinforcing ribs. JP 2005-194-A discloses a frame structure made of fiber reinforced resin provided with protrusive linear reinforcing parts which extend vertically at both sides of a plate-like framework main body. Such measures aim to improve the fixation strength of whole seat backs or to improve the strength and stiffness of a square frame structure for seat backs.

On the other hand, there are some frame structures for seat backs in which a seat frame is provided with a seatbelt retractor and a seatbelt guide (which may be called "seatbelt anchor"), independently from a vehicle frame. JP 10-129416-A discloses such a seat frame structure in which the seat back is improved in the attachment strength of the seatbelt retractor attached to the frame.

In a frame structure for seat backs in which a seatbelt retractor is attached to a seat frame, the seatbelt retractor and seatbelt guide are usually provided at the side of an end of the seat back in the vehicle width direction, and especially the seatbelt guide should be provided at the upper side of the frame. Because the seat belt is obliquely provided from the seatbelt retractor through the seatbelt guide to support a passenger in case of a vehicle crash, the frame structure is subjected to a load applied forward or obliquely forward at the seatbelt guide installation section as the passenger moves forward according to the inertial law. Therefore, the stiffness of the frame structure for seat backs has to be enhanced enough to endure the bending and torsion caused by the load.

To improve stiffness, JP 2006-81676-A and JP 2005-194-A disclose methods of enhancing the strength and stiffness of a frame structure as a whole, and JP 2000-6696-A discloses a structure in which a deterrent bar is provided at the rear side of the seat back to achieve a high strength against a load applied toward the front side of the seat back. However, in such structures to improve the stiffness and strength, it might be difficult for the frame structure to be expectedly reduced in weight and otherwise the weight might rather increase.

There is not any conventional suggestion to improve the stiffness of frame structures focusing on the load applied forward or obliquely forward through the seatbelt guide to the frame structures.

Accordingly focused on the load applied forward or obliquely forward to the frame structure for seat backs, it could be helpful to provide a frame structure for seat backs capable of achieving the stiffness improvement of the frame structure effectively against the load while the frame structure is easily reduced in weight.

SUMMARY

We provide a frame structure for a seat back to be provided in the seat back having a seatbelt retractor and a seatbelt guide at a frame top, wherein the frame structure includes an oblique frame and a vertical frame, the oblique frame obliquely extending upward to a seatbelt guide installation section from a first support point located at an end side of a lower part of the seat back in a seat width direction, the vertical frame extending upward from a second support point located at another end side of the lower part of the seat back in the seat width direction and connecting to the oblique frame at a top.

Figure 1:
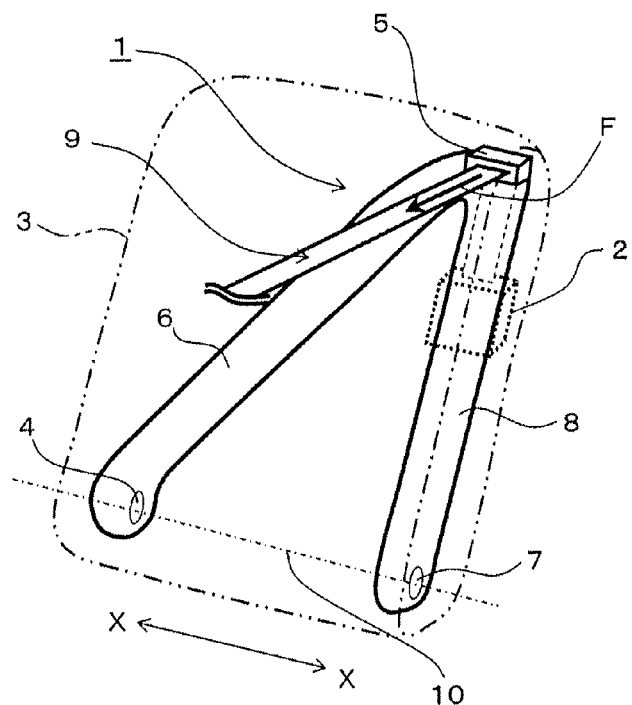
FIG. 1 is a schematic perspective view of a frame structure for seat backs according to an example.

EXPLANATION OF SYMBOLS 1, 11, 21, 31, 41: frame structure for seat backs
2: seatbelt retractor
3: seat back
4: first support point
5: seatbelt guide
5a: seatbelt guide installation section
6, 22, 32, 42: oblique frame
7: second support point
8: vertical frame
9: seat belt
10: rotation axis
12, 25, 26, 36, 45: reinforcing frame
23, 33, 43: first frame
24, 34, 44: second frame
35: upper frame
46: fiber reinforced resin tape

DETAILED DESCRIPTION

Our frame structures for seat backs are frame structures to be provided in a seat back having a seatbelt retractor and a seatbelt guide at a frame top, wherein the frame structure comprises an oblique frame and a vertical frame, the oblique frame obliquely extending upward to a seatbelt guide installation section from a first support point located at an end side of a lower part of the seat back in a seat width direction, the vertical frame extending upward from a second support point located at another end side of the lower part of the seat back in the seat width direction and connecting to the oblique frame at a top. The frame structure for seat backs is provided inside the seat back receiving the load applied to the seat back to constitute the main stiffness of the seat back. Therefore, even if the seat back has a usually provided frame or the like set with cushions, such a frame or the like is different from our frame structure for seat backs. Namely, the scope of our structures does not depend on the presence or absence of the frame or the like.

In the frame structure for seat backs having the seatbelt retractor and seatbelt guide, because the seatbelt guide is located at the upper part of the frame structure, the frame structure is subjected to a load applied forward or obliquely forward from the seat belt through the seatbelt guide installation section as an impact of the vehicle crash would move a passenger forward according to inertial law. The frame structure has the oblique frame extending obliquely upward to the seatbelt guide installation section from the first support point located at the side of one end of the lower seat back part in the seat width direction and, therefore, the load applied forward or obliquely forward is efficiently borne by the frame structure. Therefore, the stiffness of the frame structure is effectively enhanced by the oblique frame. The frame structure consists of the oblique frame and the vertical frame extending upward from the second support point so that bending stiffness of the frame structure is efficiently enhanced as a whole with substantively the least number of frame members. The frame structure for seat backs having the oblique frame effectively receives the load applied forward or obliquely forward to the seatbelt guide installation section with a high stiffness. At the same time, the frame structure can easily be reduced in weight because only a few frame members are necessary to achieve such a structure.

It is possible that the frame structure is configured to have a reinforcing frame extending between the oblique frame and the vertical frame. Such a reinforcing frame can enhance the stiffness as a whole as well as the stiffness of the oblique frame in itself.

The oblique frame may consist of a frame member or and, alternatively, it is possible that the oblique frame consists of a first frame at a front side and a second frame at a rear side in a seat front-rear direction. If the oblique frame thus consists of two frames of the first frame and second frame, each frame member functions separately while the high stiffness of the oblique frame as a whole is structurally maintained as reducing the oblique frame in weight as a whole. For example, the stiffness of the first frame at the front side highly contributes to the bending stiffness of the frame structure to which a load applied obliquely forward and, therefore, if the first frame has a high stiffness the frame structure can be efficiently prevented from bending caused by the load applied forward or obliquely forward.

It is possible that each of the first frame and second frame has a reinforcing frame extending between the oblique frame and the vertical frame. Thus configured reinforcing frames can enhance the stiffness of the first frame and second frame so that the stiffness of the frame structure is substantially enhanced as a whole.

In this case, it is preferable that each of the first frame and the second frame has a stiffness higher than a stiffness of the reinforcing frame. The reinforcing frame is provided mainly to improve the stiffness of the first frame and second frame. However, the reinforcing frame having excessively high stiffness might be heavy and would not contribute to weight savings. As a whole, necessary stiffness is mainly supposed to be achieved with the first frame, second frame and vertical frame.

To efficiently enhance frame stiffness against the load applied obliquely as reducing in weight as a whole, it is preferable that the first frame, which is supposed to mainly receive the load, is configured to have the highest stiffness among the first frame, the second frame, the vertical frame and the reinforcing frames.

To make the first frame have a stiffness high enough to receive the load more effectively, it is possible that the first frame is configured to bend convexly toward a seat front side, as viewed from the seat lateral side. Such a convex bending structure can increase the apparent area of the cross section of the first frame in the seat front-rear direction so that stiffness is efficiently enhanced without an increase in weight.

The first frame and the second frame may be configured to have various structures. It is possible that the first frame and the second frame are united into a single oblique frame at a position higher than a middle position in an extension direction. In such a configuration, stiffness can be enhanced with a frame member structure consisting of the first frame and the second frame at the lower part in which the moment caused by the load acts greatly while a light united structure can be achieved with the first frame and the second frame at the upper part in which the smaller moment acts.

If the reinforcing frame connects to each of the first frame and the second frame, it is possible that each of the reinforcing frames connects to each of the first frame and the second frame above each middle position in the extension direction. In such a structure, the first frame and the second frame are effectively prevented from deforming.

It is possible that at least a part of the frame structure is made of a resin to respond to demands of weight saving of the frame structure for seat backs. It is preferable that the frame structure is made of a resin as a whole. A few frame members consisting of the oblique frame and the vertical frame enhance the stiffness efficiently so that stiffness can be kept sufficiently high even if the components are made of resin instead of metal. Such a usage of the resin can reduce the weight as a whole.

It is preferable that at least a part of the frame structure is made of a fiber reinforced resin. Employment of the fiber reinforced resin can easily achieve both desirable weight saving and enhancement of the stiffness for the frame structure for seat backs as a whole. Above all, it is preferable that at least a part of the oblique frame to mainly receive the load is made of the fiber reinforced resin.

If the fiber reinforced resin is employed, it is possible that at least a part of one of the frames is made of the fiber reinforced resin or, alternatively, it is possible that at least a part of one of the frames is pasted with a fiber reinforced resin tape in which reinforcing fibers are unidirectionally-oriented. If each frame is pasted with the fiber reinforced resin tape so that the orientation of the reinforcing fibers is in parallel with the extension direction of each frame, the bending stiffness of each frame can be enhanced effectively. Otherwise, the torsion stiffness of each frame can be enhanced by the angle between the orientation of the reinforcing fibers and the extension direction. The above-described options can be combined with each other in such a structure. Such option combinations can be selected depending on required specifications.

The reinforcing fibers are not restricted particularly, and reinforcing fibers such as carbon fiber, glass fiber and aramid fiber, may be combined. Matrix resins of the fiber reinforced resin are not particularly restricted and may be thermoplastic resin, thermosetting resin or combinations thereof.

The frame structure for seat backs is not particularly restricted as far as being a frame structure to be provided in a seat back having the seatbelt retractor and the seatbelt guide. For example, it is applicable to the one provided inside a tiltable seat back.

Thus, the frame structure for seat backs makes it possible that the basic structure having the oblique frame and the vertical frame to the seatbelt guide installation section at the top effectively improves the stiffness of the frame structure particularly against the load applied forward or obliquely forward to the frame structure and the lightweight frame structure can easily be achieved.

Hereinafter, examples of our structures will be explained with reference to the figures.

FIG. 1 shows a frame structure for seat backs according to an example. Frame structure 1 for seat backs shown in FIG. 1 is configured as a frame structure installed inside seat back 3 (or a cushion for seat backs). Frame structure 1 for seat backs is provided with seatbelt retractor 2 with which seat belt 9 is taken up and wound off to support passengers through seatbelt guide 5. Frame structure 1 for seat backs comprises oblique frame 6 and vertical frame 8, the oblique frame 6 extending obliquely upward to an installation section of the seatbelt guide 5 from first support point 4 located at an end of the lower part of the seat back 3 in width direction X-X, the vertical frame 8 extending upward to connect the oblique frame 6 at the top from second support point 7 located at another end of the lower part of the seat back 3 in seat width direction X-X. A reclining mechanism (not shown) of the seat back 3 is attached to the first support point 4 so that the seat back can be fixed as tiltable around seat-back rotation axis 10 connecting the first support point 4 and the second support point 7. The frame structure 1 is supported by the second support point 7 to be allowed to rotate around only rotation axis 10. It is preferable that the frame structure 1 for seat backs is integrated into a single piece made of fiber reinforced resin such as carbon fiber reinforced resin.

In case of a vehicle crash, if the frame structure 1 is subjected to load F applied forward or obliquely forward at the installation section for the seatbelt guide 5 by the seat belt, the frame structure might deform as distorting and bending to the vehicle front side because rotation around the rotation axis 10 is restricted at the first support point 4 by the reclining mechanism. In spite of such a deformation, the oblique frame 6 extending obliquely from the first support point 4 toward the upper seatbelt guide 5 can effectively support load F and, therefore, stiffness of the frame structure 1 is enhanced effectively. Further, the vertical frame 8 can support the horizontal component of load F together with the oblique frame 6. Furthermore, if the frame structure 1 consists of the oblique frame 6 and the vertical frame 8, stiffness of the frame structure as a whole can be efficiently enhanced with a small number of frame members, to achieve the lightweight frame structure 1.

Figure 2:
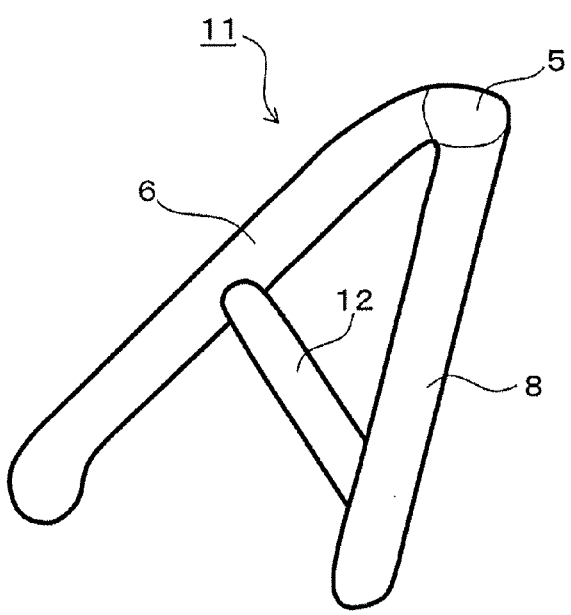
FIG. 2 is a schematic perspective view of a frame structure for seat backs according to another example.

Such a frame structure for seat backs can be configured as various examples as follows. In FIG. 2, frame structure 11 for seat backs is provided with a reinforcing frame 12 extending from the vertical frame 8 to the oblique frame 6, in addition to the same structure as shown in FIG. 1 in which the oblique frame 6 and the vertical frame 8 connect at the seatbelt guide installation section 5a at the top. The reinforcing frame 12 may be made of fiber reinforced resin and the frame structure 11 can be integrated into a single piece. The reinforcing frame 12 enhances stiffness of the frame structure 11 as a whole as well as the oblique frame 6 only.

Figure 3:
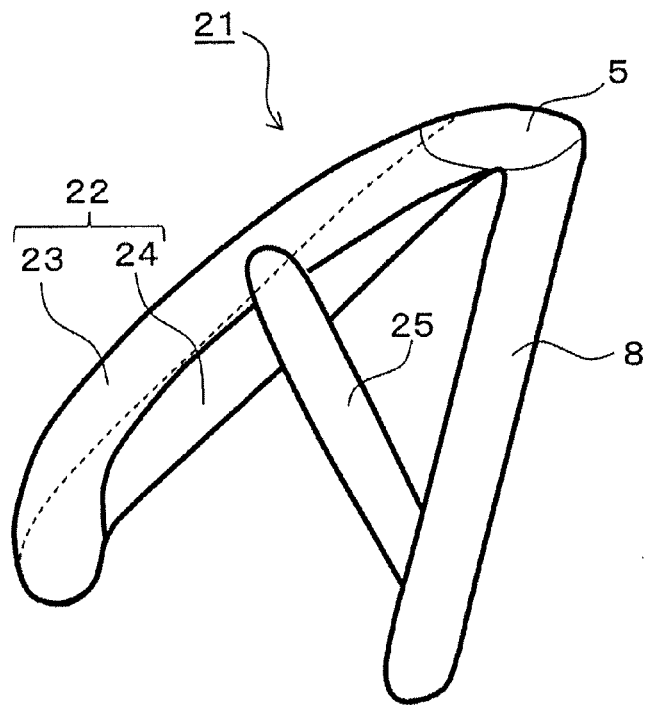
FIG. 3 is a schematic perspective view of a frame structure for seat backs according to yet another example.

In FIG. 3, the frame structure 21 for seat backs is provided with the oblique frame 22 consisting of two frame members of the first frame 23 located at the seat front side and the second frame 24 located at the seat rear side, and is provided with the reinforcing frame 25 extending from the vertical frame 8 to the first frame 23 of the oblique frame 22. The first frame 23 is configured to bend as convex toward the seat front with respect to the view from the seat lateral side. In such a configuration, the stiffness of the oblique frame 22 can be efficiently enhanced by arranging the oblique frame 22 with the first frame 23 and the second frame 24 which are separated from each other. In addition, the first frame 23 for supporting an oblique load causing the bending deformation may be configured to bend as convex toward the seat front, so that the first frame 23 and the oblique frame 22 are reduced in weight while efficiently enhancing stiffness.

Figure 4:
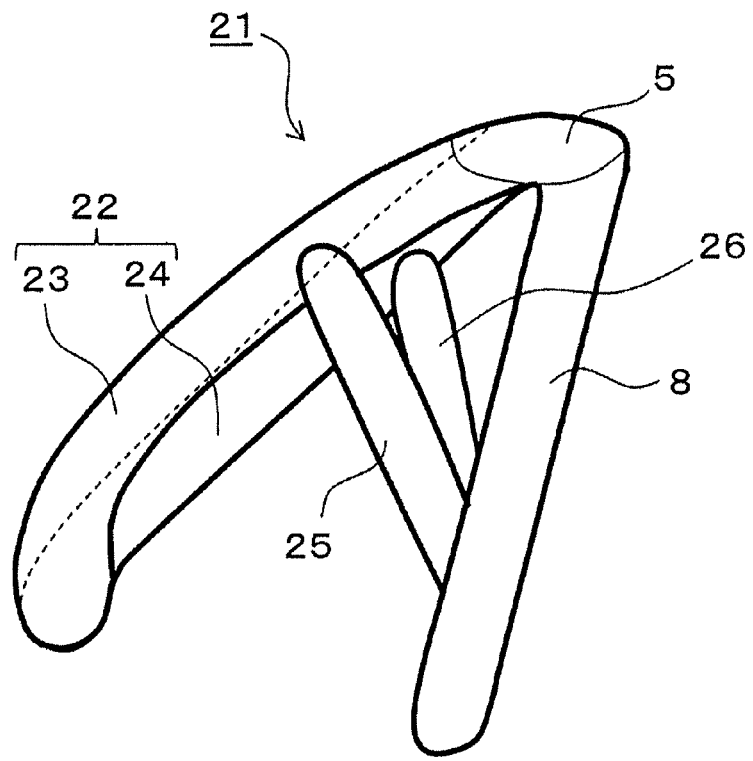
FIG. 4 is a schematic perspective view of a frame structure for seat backs according to yet another example.

In FIG. 4, the frame structure 21 for seat backs is provided with the oblique frame 22 consisting of two frame members of the first frame 23 located at the seat front side and the second frame 24 located at the seat rear side, and is provided with the reinforcing frames 25 and 26 each extending from vertical frame 8 respectively to the first frame 23 and the second frame 24 of the oblique frame 22. The first frame 23 is configured to bend as convex toward the seat front with respect to the view from the seat lateral side. In such a configuration, the stiffness of the oblique frame 22 can be efficiently enhanced by arranging the oblique frame 22 with the first frame 23 and the second frame 24 which are separated from each other. In comparison with the structure shown in FIG. 3, each of the first frame 23 and the second frame 24 is provided with the reinforcing frames 25 and 26 respectively so that each frame member functions separately while the high stiffness of the oblique frame 22 as a whole can be structurally maintained as reducing the oblique frame 22 in weight as a whole. Further, each of the reinforcing frames 25 and 26 connects to each of the first frame 23 and the second frame 24 above the middle position in the extension direction so that the first frame 23 and the second frame 24 are effectively prevented from deforming.

Figure 5:
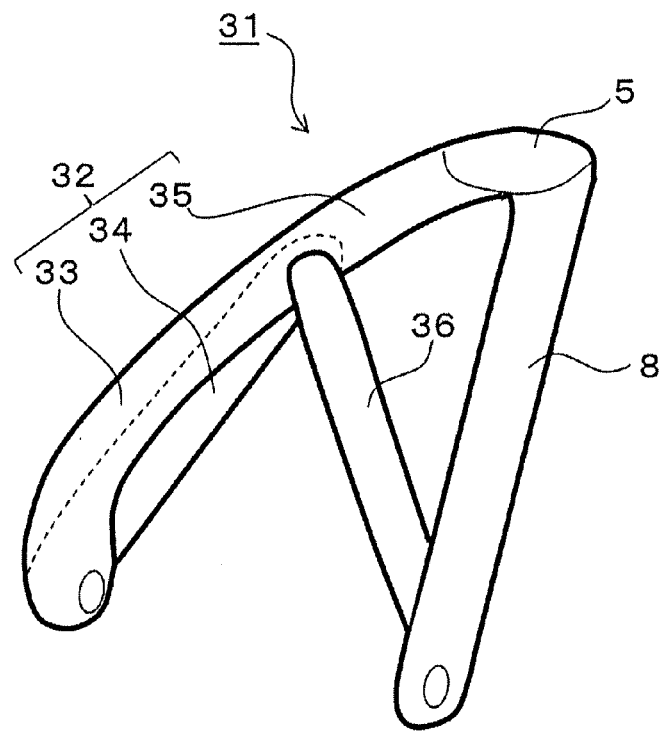
FIG. 5 is a schematic perspective view of a frame structure for seat backs according to yet another example.

In FIG. 5, the frame structure 31 for seat backs is provided with the oblique frame 32 which consists of two frame members of the front first frame 33 and the rear second frame 34 below the middle position in the extension direction while the two frame members are united into the single upper frame 35 above the middle position. The reinforcing frame 36 extending from the vertical frame 8 connects to or around the position where first frame 33 and second frame 34 are united. In such a configuration, a section required to have a high stiffness consists of two frame members of the first frame 33 and the second frame 34 to achieve a structure having a high stiffness while the upper part of the oblique frame 32 to be enough to have a high stiffness consists of the united upper frame 35 to reduce in weight.

Figure 6:
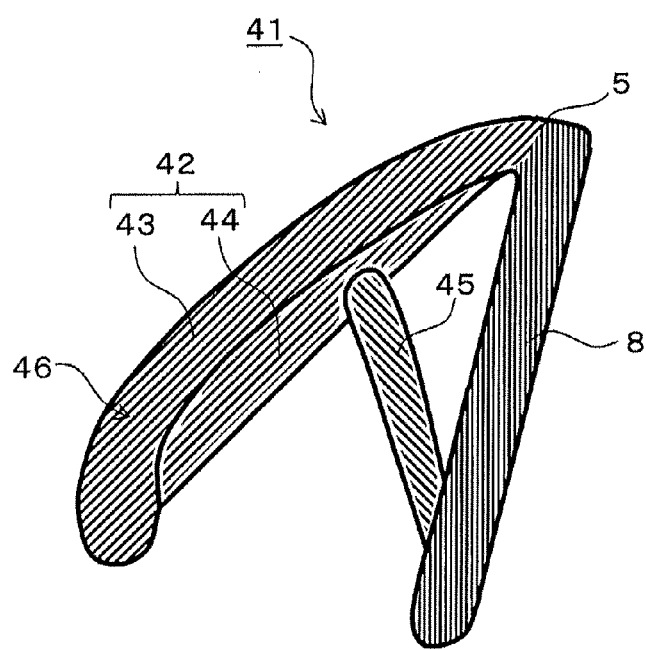
FIG. 6 is a schematic perspective view of a frame structure for seat backs according to yet another example.

In FIG. 6, like the example shown in FIG. 3, the frame structure 41 for seat backs is provided with the oblique frame 42 consisting of two frame members of the first frame 43 located at the seat front side and the second frame 44 located at the seat rear side, and is provided with the reinforcing frame 45 extending from the vertical frame 8 to the first frame 43 of the oblique frame 42. The frame structure 41 is pasted with the fiber reinforced resin tape (unidirectional fiber reinforced resin tape) 46 having unidirectionally-oriented reinforcing fibers. Each frame may be pasted with the fiber reinforced resin tape 46 to orient the fibers along the extension direction so that the stiffness of the frame structure 41 is efficiently reinforced easily. The frame may be partially pasted with the fiber reinforced resin tape 46 which is different from the one covering over the frame shown in FIG. 6. Further, at least a part of the unidirectional fiber reinforced resin tape may be buried in the resin layer of frame structure 41. Alternatively, a whole unidirectional fiber reinforced resin tape may be buried in the resin layer to cover the surface of the unidirectional fiber reinforced resin tape with the resin layer.

Thus, our structures are applicable to various examples having oblique frames, reinforcing frames and reinforcing formations of each sections.

INDUSTRIAL APPLICATIONS OF THE INVENTION

Our structures are applicable to every frame structure for seat backs which has a seatbelt guide at the upper side.

The invention claimed is:

1. A frame structure for a seat back to be provided in the seat back having a seatbelt retractor and a seatbelt guide at a frame top, wherein the frame structure comprises an oblique frame and a vertical frame, the oblique frame obliquely extending upward to a seatbelt guide installation section from a first support point located at an end side of a lower part of the seat back in a seat width direction, the vertical frame extending upward from a second support point located at another end side of the lower part of the seat back in the seat width direction and connecting to the oblique frame at a top of the vertical frame, wherein the oblique frame consists of a first frame at a front side and a second frame at a rear side in a seat front-rear direction,
wherein the first frame and the second frame are partially united to form a space between the first frame and the second frame.

2. The frame structure for the seat back according to claim 1, wherein the first frame bends as convex toward a seat front side, as viewed from the seat lateral side.

3. The frame structure for the seat back according to claim 1, wherein the first frame and the second frame are united into a single oblique frame at a position higher than a middle position in an extension direction.

4. The frame structure for the seat back according to claim 1, wherein the frame structure is to be provided inside a tiltable seat back.

5. The frame structure for the seat back according to claim 1, wherein at least a part of the frame structure is pasted with a fiber reinforced resin tape in which reinforcing fibers are unidirectionally-oriented.

6. The frame structure for the seat back according to claim 1, wherein at least a part of the frame structure is made of a resin.

7. The frame structure for the seat back according to claim 1, wherein at least a part of the frame structure is made of a fiber reinforced resin.

8. The frame structure for the seat back according to claim 7, wherein at least a part of the oblique frame is made of the fiber reinforced resin.

9. A frame structure for a seat back to be provided in the seat back having a seatbelt retractor and a seatbelt, guide at a frame top, wherein the frame structure comprises an oblique frame and a vertical frame, the oblique frame obliquely extending upward to a seatbelt guide installation section from a first support point located at an end side of a lower part of the seat back in a seat width direction, the vertical frame extending upward from a second support point located at another end side of the lower part of the seat back in the seat width direction and connecting to the oblique frame at a top of the vertical frame, wherein the oblique frame consists of a first frame at a front side and a second frame at a rear side in a seat front-rear direction, wherein each of the first frame and second frame has a reinforcing frame extending between the oblique frame and the vertical frame.

10. The frame structure for the seat back according to claim 9, wherein each of the first frame and the second frame has a stiffness higher than a stiffness of the reinforcing frame.

11. The frame structure for the seat back according to claim 9, wherein the first frame has a highest stiffness among the first frame, the second frame, the vertical frame and the reinforcing frame.

12. The frame structure for the seat back according to claim 9, wherein each of the reinforcing frames connects to each of the first frame and the second frame above each middle position in the extension direction.

* * * * *